United States Patent [19]
Kawakami et al.
[11] 3,810,135
[45] May 7, 1974

[54] CONTROL CIRCUIT OF RECORDING AND REPRODUCING SIGNALS TO AND FROM MAGNETIC TRANSDUCERS FOR MAGNETIC MEMORY APPARATUS

[75] Inventors: Kanji Kawakami; Eiji Kaneko, both of Hitachi, Japan
[73] Assignee: Hitachi, Ltd., Tokyo, Japan

[22] Filed: Oct. 13, 1972
[21] Appl. No.: 297,301

[30] Foreign Application Priority Data
Oct. 13, 1971 Japan .............................. 46-80147

[52] U.S. Cl. ...................................... 360/62, 360/63
[51] Int. Cl. ........................................... G11b 5/02
[58] Field of Search...340/174.1 G, 174.1 H, 174.1 D

[56] References Cited
UNITED STATES PATENTS

| | | | |
|---|---|---|---|
| 3,115,621 | 12/1963 | Slevin | 340/174.1 D |
| 2,926,298 | 2/1960 | Newhouse | 340/174.1 D |
| 3,119,095 | 1/1964 | Hansen | 340/174.1 D |
| 3,152,322 | 10/1964 | Lawrence | 340/174.1 D |

*Primary Examiner*—Vincent P. Canney
*Attorney, Agent, or Firm*—Craig and Antonelli

[57] ABSTRACT

A control circuit for recording and reproducing signals to and from magnetic heads for magnetic memory apparatus has a plurality of full wave rectifier circuits, each of which is connected to a corresponding magnetic head and an NPN transistor is connected between the output terminals of each full wave rectifier circuit. The transistor is saturated during the recording operation of the corresponding magnetic head and switched into an active region during the reproducing operation of the corresponding magnetic head.

7 Claims, 1 Drawing Figure

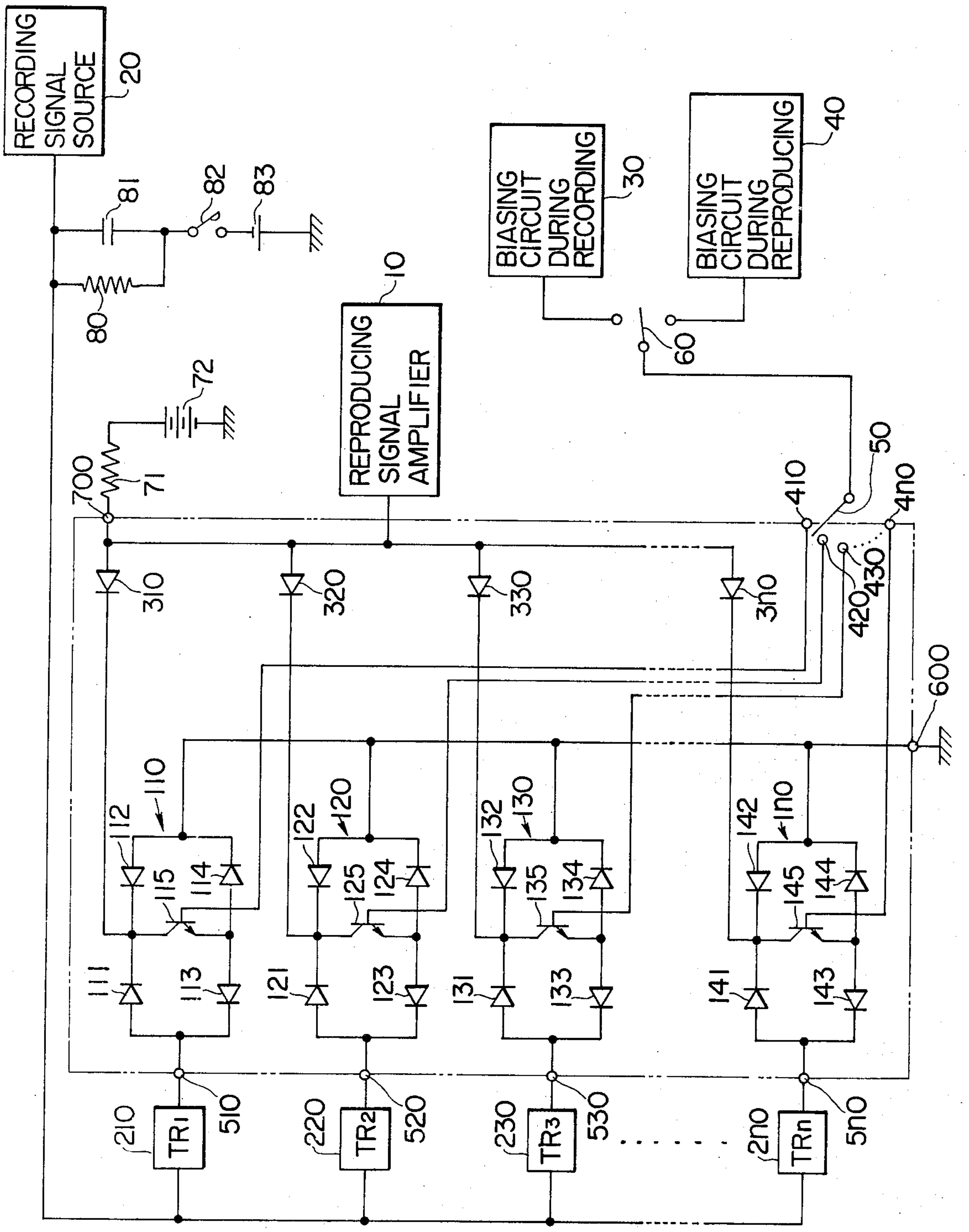
RECORDING SIGNAL SOURCE
REPRODUCING SIGNAL AMPLIFIER
BIASING CIRCUIT DURING RECORDING
BIASING CIRCUIT DURING REPRODUCING
TR1
TR2
TR3
TRn

CONTROL CIRCUIT OF RECORDING AND REPRODUCING SIGNALS TO AND FROM MAGNETIC TRANSDUCERS FOR MAGNETIC MEMORY APPARATUS

This invention relates to control circuit for recording and reproducing electrical signals to and from magnetic transducers of magnetic memory apparatus and, more particularly, a circuit which switches between recording and reproducing operations of a specific magnetic transducer.

When recording and reproducing electrical signals on a magnetic recording medium such as a magnetic drum and a magnetic tape through a great number of fixed magnetic transducers, a circuit is required which selects a specific magnetic transducer and supplies electrical current signals to the specific magnetic transducer for recording or writing the electrical information signals on the magnetic recording medium and further selects reproduced or read-out information signal voltages appearing in a specific magnetic transducer from the magnetic recording medium and transmits the signal voltages to a voltage amplifier.

A magnetic transducer head made through a deposited thin film technique has been proposed for recording signals on the magnetic medium with a considerably greater density and at a considerably higher frequency or shorter wave length.

Conventional control circuits for selecting a specific magnetic transducer and switching the operation of a specific magnetic transducer between that of recording and reproducing have been employed, e.g. a pulse transformer or a combination switch formed of a PNP transistor and an NPN transistor. However, the former circuit cannot transmit current pulses with a steep wave front, that is, high frequency current pulses, which limits the memory density on the recording medium and the latter circuit has an offset voltage between the emitter and collector of the combination switch of the PNP transistor and the NPN transistor. This causes a transmitting characteristic of a small reproduced signal voltage. To overcome this disadvantage the number of turns of the magnetic head has been increased, which results in an increase in the size of the magnetic head and reducing the memory density on the magnetic recording medium.

SUMMARY OF THE INVENTION:

One object of the present invention is to provide a control circuit for recording and reproducing signals to and from magnetic transducers for magnetic memory apparatus which transmits high frequency electrical pulse currents with both polarities to the magnetic recording medium through the magnetic transducer.

Another object of the present invention is to provide a control circuit for recording and reproducing signals to and from magnetic transducers for magnetic memory apparatus which receives and amplifies small reproduced signal voltages from the magnetic recording medium through the magnetic transducer to a reproducing signal amplifier.

Still another object of the present invention is to provide a control circuit for recording and reproducing signals to and from magnetic transducers for magnetic memory apparatus which increases the memory density on the magnetic recording medium.

A further object of the present invention is to provide a control circuit for recording and reproducing signals to and from magnetic transducers for magnetic memory apparatus which is particularly suitable for integrated circuit formation.

Still a further object of the present invention is to provide a control circuit for recording and reproducing signals to and from magnetic transducers for magnetic memory apparatus which transmits up to a 10MHz electrical current signal with both polarities to the magnetic recording medium through the magnetic transducer.

Still another further object of the present invention is to provide a control circuit for recording and reproducing signals to and from magnetic transducers for magnetic memory apparatus which transmits both polarity current pulses of up to 0.3 ~ 0.7A and of a 30 ~ 50 n sec wavefront, without influencing the adjacent magnetic transducers and receives reproduced signal voltages of down to 0.3 ~ 2.0 mV and of a 30 ~ 50 n sec wavefront with no effect on the adjacent magnetic transducers.

A control circuit for recording and reproducing electrical signals to and from magnetic transducers for magnetic memory apparatus of the present invention comprises a full wave rectifier circuit, a transistor connected between the output terminals of the full wave rectifier circuit, a first biasing means for placing the transistor in the saturation region during recording the operation of the corresponding specific magnetic head and second biasing means for biasing the transistor in an active region during the reproducing operation of the corresponding specific magnetic head.

BRIEF DESCRIPTION OF THE DRAWING:

The FIGURE shows a control circuit for recording and reproducing signals to and from magnetic transducers for magnetic memory apparatus of the present invention.

DESCRIPTION OF THE PREFERRED EMBODIMENT:

Referring to the FIGURE, the control circuit of the present invention comprises a plurality of identical switching circuits 110,120,130, . . . 1n0, which switch between the recording or writing operation and the reproducing or reading operation of magnetic heads 210, 220, 230, . . . . , 2n0. For example, 36 magnetic heads 210, 220, 230, . . . 2n0 are fixedly arranged on a face of magnetic information recording medium such as a magnetic tape. Since the switching circuits 110, 120, 130, . . . . . 1n0 are identical, only one exchange circuit 110 will be explained for the sake of brevity. Diodes 111, 112, 113, and 114 of the switching circuit 110 form a full wave rectifier circuit. The collector and emitter of a NPN transistor 115 are connected between the output or alternative current terminals. The base electrode of the NPN transistor 115 is connected to the terminal 410 of a selecting switch 50. One input or direct current terminal 510 of the full wave rectifier circuit of the switching circuit 110 is connected to one terminal of corresponding magnetic head 210. The other input terminal of the full wave rectifier circuit of the switching circuit 110 is connected to ground through a terminal 600. Each collector terminal of the respective NPN transistor 115, 125, 135, . . . 1n5 is connected to a reproducing signal amplifier 10 through respective diodes 310, 320, 330, . . . 3n0 for transmitting electrical signals from respective magnetic heads 210, 221, 230, . . . 2n0. A first direct current biasing source 72 is connected between a common anode terminal 700 of the respective diodes 310, 320, 330, . . . . 3n0 and ground through a first current limiting resistor 71. The other terminals of respective magnetic heads 210, 220, 230, . . . 2n0 are connected in common to a recording signal source 20 for receiving recording or writing signals therefrom. A second direct current biasing source 83 is connected between the common lead wire from respective magnetic heads 210, 220, 230, . . . . 2n0 to the recording signal source 20 and ground through a parallel circuit of a second current limiting resistor 80 and bypass capacitor 81 and a switch 82. A biasing circuit during recording 30 and a biasing circuit during reproducing 40 are connectable to the base electrode of one of the NPN transistors of the switching circuits 110, 120, 130, . . . . 1n0 through a switch 60 and the selecting switch 50.

When writing or recording electrical signal information on the magnetic recording medium such a magnetic tape, one of the magnetic heads has to be selected for the recording. Assuming that the magnetic head 210 is required to write information, the selecting switch 50 is closed to the terminal 410 and the switch 60 is connected to the biasing circuit during recording 30 which supplies a constant base current without being affected by variations in the base voltage of the NPN transistor 115. As a result, the NPN transistor 115 is saturated and the other NPN transistors 125, 135, . . . . 1n5 of the non-selected switching circuits 120, 130, . . . . . 1n0 remain in cutoff. High frequency electrical signals of both polarities from the recording signal source 20 to the magnetic head 210 are transmitted through a diode 111, the NPN transistor 115 and the diode 114 to ground or through the diode 113, the NPN transistor 115 and the diode 112 from ground. The diode 310 works to separate or isolate the selected switching circuit 110 from the non-selected switching circuits 120, 130, . . . 1n0.

When certain magnetic information stored on the tape is to be read out or reproduced, one of the corresponding magnetic heads has to be selected; in this instance, assume again the magnetic head 210 is required to be selected. The selecting switch 50 is closed to the terminal 410 and the switch 60 is connected to the biasing circuit during reproducing 40 for applying a bias to the base electrode of the NPN transistor 115 of the selected switching circuit 110. The switch 82 is also closed to apply a bias from the second direct current biasing source 83 to the diodes 111, 112, 113, and 114 and the NPN transistor 115 to which a bias is also applied from the first direct current source 72 through the first current limiting resistor 71 and the diode 310. As a result, the NPN transistor 115 is biased in the active region, the diodes 111, 112, and 114 are reversely biased, and only the diode 113 is forwardly biased. The other NPN transistors 125, 135, . . . 1n5 of the non-selected switching circuits 120, 130, . . . . 1n0 remain cut-off and consequently, electrical signals reproduced or read-out from the magnetic head flow through the diode 113, the NPN transistor 115, the diode 310, the first direct current biasing source 72, the second direct current biasing source 83, the switch 82 and the bypass capacitor 81, and the reproduced electrical signal voltages are transferred to the reproducing signal amplifier 10. As the base of the NPN transistor 115 is connected to ground through the biasing circuit during reproducing 40, the NPN transistor 115 constitutes a grounded base voltage amplifier. Accordingly, the electrical signals from the magnetic head 210 are amplified through the NPN transistor and, thereafter, are transmitted to the reproducing signal amplifier 10. For rendering the NPN transistor 115 a grounded base voltage amplifier, the resistance values of the current limiting resistors 71 and 80 have to be suitably chosen.

When the control circuit of the present invention is performing the reproducing operation, the recording signal source 20 is in a stand-by condition, and the output impedance of the recording signal source 20 during the stand-by condition is chosen to be extremely high; consequently, the recording signal source 20 does not influence the control circuit during the reproducing operation thereof. Further, the amount of current through the magnetic head 210, the diode 113 and the NPN transistor 115 during the reproducing operation is chosen to be extremely small compared to that during the recording operation, and the current through the magnetic head 210 never erases the magnetic information stored on the recording medium such as a magnetic tape. Reproduced signal voltages appearing in the non-selected magnetic heads 220, 230, . . . . . 2n0 decrease to very small values through the respective switching circuits 120, 130, . . . . . 1n0 and the respective diodes 320, 330, . . . . . 3n0 and the amount of the signal voltages transmitted to the reproducing signal amplifier 10 are extremely small. On the other hand, the reproduced signal voltages appearing in the selected magnetic head 210 are amplified through the switching circuit 110, and the signal and noise ratio (S/N) of the reproduced signal voltages is greatly improved.

The circuit enclosed by the broken line shown in the FIGURE is particularly suitable for being formed into an integrated circuit. Further, when the circuit is formed into an integrated circuit, the number of terminals, to be provided out from the integrated circuit, which depends on the number of switching circuits, is greatly reduced. Assuming the number of switching circuits is n, which is the same as the number of magnetic heads, the number of terminals becomes $2n + 2$, that is, terminals 510, 520, 530, . . . 5n0, and 410, 420, 430, . . . . 4n0 and 600 and 700.

Further, the switching circuits of the present invention do not have a cut-off voltage as explained above, and transmit and amplify very small reproduced signal voltages to the reproducing signal amplifier; consequently, the number of turns of the corresponding magnetic heads is reduced and the memory density of the recording medium is greatly increased.

The magnetic head and tape were employed as a magnetic transducer and magnetic recording medium for an explanation of the present invention; however, the control circuit of the present invention may also be applied to a wire memory apparatus.

We claim:

1. A control circuit for recording and reproducing signals to and from magnetic transducers for magnetic memory apparatus comprising:

a plurality of switching circuits, each of which has a full wave rectifier circuit and a transistor, the collector and emitter of said transistor being connected between the output terminals of said full wave rectifier circuit, one input terminal of said full wave rectifier circuit being connected to one terminal of each corresponding magnetic transducer, the other input terminal of said full wave rectifier circuit being connected to ground, each collector of said transistors being connected together to a reproducing signal amplifier, and each of the other terminals of said magnetic transducers being connected together to a recording signal source;

a selecting switch for selecting one of said switching circuits for operation thereof;

first biasing means for biasing the transistor of a selected switching circuit to saturation during the recording operation of the selected switching circuit;

second biasing means for biasing the transistor of the selected exchange circuit in an active region during the reproducing operation of the selected switching circuit; and third biasing means for applying a forward bias to a rectifier means provided in one branch of said full wave rectifier circuit of the selected switching circuit and for applying a reverse bias to a rectifier means provided in the other three branches of said full wave rectifier circuit of the selected switching circuit during the reproducing operation of the selected switching circuit.

2. A control circuit for recording and reproducing signals to and from magnetic transducers for magnetic memory apparatus as claimed in claim 1, further comprising diode means connected between each collector of said transistors and the reproducing signal amplifier for isolating the selected switching circuit from the non-selected switching circuits during the recording and reproducing operation of the selected switching circuit.

3. A control circuit for recording and reproducing signals to and from magnetic transducers for magnetic memory apparatus as claimed in claim 2, wherein said diode means is connected through a current limiting resistor to a source of forward bias potential therefor.

4. A control circuit for recording and reproducing signals to and from magnetic transducers for magnetic memory apparatus as claimed in claim 1, wherein said third biasing means comprises a source of bias potential having one electrode thereof switchably connected through a resistor capacitor network to a common connection of said transducers.

5. A control circuit for recording and reproducing signals to and from magnetic transducers for magnetic memory apparatus comprising:

a plurality of switching circuits, each of which has a full wave rectifier circuit and a transistor, the collector and emitter of said transistor being connected between the output terminals of said full wave rectifier circuit, one input terminal of said full wave rectifier circuit being connected to one terminal of each corresponding magnetic transducer, the other input terminal of said full wave rectifier circuit being connected to ground, each collector of said transistors being connected together to a reproducing signal amplifier, and each of the other terminals of said magnetic transducers being connected together to a recording signal source;

a selecting switch for selecting one of said switching circuits for operation thereof;

first biasing means for applying a bias to the base of the transistor in the selected switching circuit through said selecting switch during the recording operation of the selected switching circuit;

second biasing means for applying a bias to the base of the transistor in the selected switching circuit through said selecting switch during the reproducing operation of the selected switching circuit; and third biasing means for applying a forward bias to the rectifier means provided in one branch of said full wave rectifier circuit of the selected switching circuit and for applying a reverse bias to the rectifier means provided in the other three branches of said full wave rectifier circuit of the selected switching circuit during the reproducing operation thereof, thereby biasing said transistor of the selected switching circuit in the saturation region and transferring recording signals from the recording signal source to the magnetic transducer corresponding to the selected switching circuit during the recording operation thereof, and biasing said transistor of the selected switching circuit in an active region and transferring reproducing signals from the magnetic transducer corresponding to the selected switching circuit to the reproducing signal amplifier through said transistor and the rectifier means of the one branch of said full wave rectifier circuit of the selected switching circuit during reproducing operation thereof.

6. A control circuit for recording and reproducing signals to and from magnetic transducers for magnetic memory apparatus as claimed in claim 5, further comprising diode means being connected between each collector of said transistors and the reproducing signal amplifier for isolating the selected switching circuit from the non-selected switching circuit during the recording and reproducing operation of the selected switching circuit.

7. A control circuit for recording and reproducing signals to and from magnetic transducers for magnetic memory apparatus comprising:

a plurality of switching circuits, each of which having a full wave rectifier circuit and a transistor, the collector and emitter of said transistor being connected between output terminals of said full wave rectifier circuit, one input terminal of said full wave rectifier circuit being connected to one terminal of each corresponding magnetic transducer, the other input terminal of said full wave rectifier circuit being connected to ground, each collector of said transistors being connected together to a reproducing signal amplifier, and each of the other terminals of said magnetic transducers being connected together to a recording signal source;

a selecting switch for selecting one of said switching circuits for operation thereof;

first biasing means for applying a bias to the base of the transistor in the selected switching circuit through said selecting switch during recording operation of the selected switching circuit;

second biasing means for applying a bias to the base of the transistor in the selected switching circuit through said selecting switch during the reproducing operation of the selected switching circuit;

third biasing means for applying a forward bias to the rectifier means provided in one branch of said full wave rectifier circuit between the emitter terminal of the transistor of the selected switching circuit and the one terminal of the corresponding magnetic transducer and for applying reverse bias to the rectifier means provided in the other three branches of said full wave rectifier circuit of the selected switching circuit; and diode means, connected between each collector of said transistors and the reproducing signal amplifier, for separating the selected switching circuit from the non-selected switching circuits during the recording and reproducing operation of the selected switching circuit, thereby biasing said transistor of the selected switching circuit to saturation and transferring recording signals from the recording signal source to the magnetic transducer corresponding to the selected switching circuit during the recording operation thereof, and biasing said transistor of the selected switching circuit to an active region and transferring reproducing signals from the magnetic transducer corresponding to the selected switching circuit to the reproducing signal amplifier through said transistor and the rectifier means of the one branch of said full wave rectifier circuit of the selected switching circuit during the reproducing operation thereof.

* * * * *